United States Patent [19]

Simon et al.

[11] 3,798,430

[45] Mar. 19, 1974

[54] REDUCTION OF SERVO FOLLOWING ERRORS IN POSITION AND VELOCITY CONTROL SYSTEMS OF THE ITERATIVELY COMPUTING TYPE

[75] Inventors: James B. Simon; Thomas B. Bullock, both of Fond du Lac, Wis.

[73] Assignee: Giddings & Lewis, Inc., Fond du Lac, Wis.

[22] Filed: Feb. 27, 1973

[21] Appl. No.: 336,268

[52] U.S. Cl........... 235/151.11, 235/150.1, 318/573
[51] Int. Cl........................ G06f 15/46, G05b 21/00
[58] Field of Search..................... 235/150.1, 151.11

[56] References Cited
UNITED STATES PATENTS
2,829,329  4/1958  Silva .................................. 235/151

Primary Examiner—Eugene G. Botz
Attorney, Agent, or Firm—Wolfe, Hubbard, Leydig, Voit & Osann, Ltd.

[57] ABSTRACT

Methods and apparatus for reducing following errors in the servo drives of positioning and velocity control systems wherein the commanded position is signaled and updated by increments $\Delta X$ during each successive equal time periods $\Delta T$, —so as to cause the controlled member movable along any axis X to travel at a velocity $V_x = \Delta X/\Delta T$. The commanded position is updated by iterative computations at least once during each period $\Delta T$, and the $\Delta X$ increments to be used for such updating are numerically signaled and can be changed as frequently as once during each period $\Delta T$. In order to create a feed forward signal for application to the servo in a sense additive to the position command signal, the digitally signaled number $\Delta X$ is converted into a corresponding analog signal. In the preferred arrangement, this conversion is accomplished by a counter which is preset to the number $\Delta X$ at regularly recurring instants and arranged to count down whenever the number held in the counter is other than zero. A decoder responsive to a predetermined count, for example zero, not only terminates the counting action until the next presetting but also produces a constant frequency, variable duty cycle squarewave having an average or dc. value proportional to the number $\Delta X$ and which serves as an accurate feed forward input to the servo.

14 Claims, 8 Drawing Figures

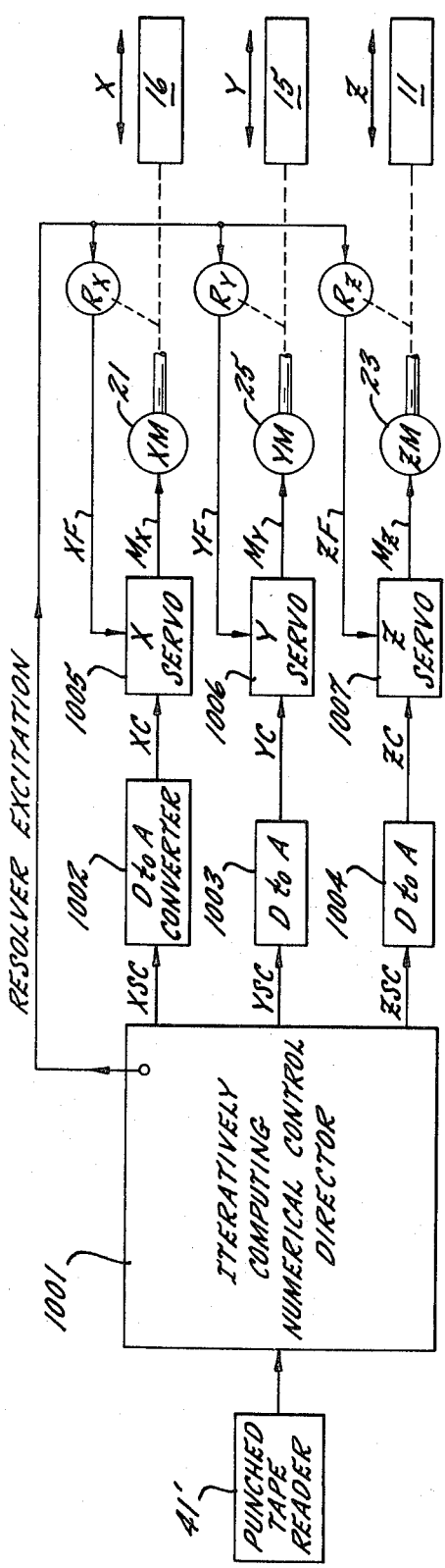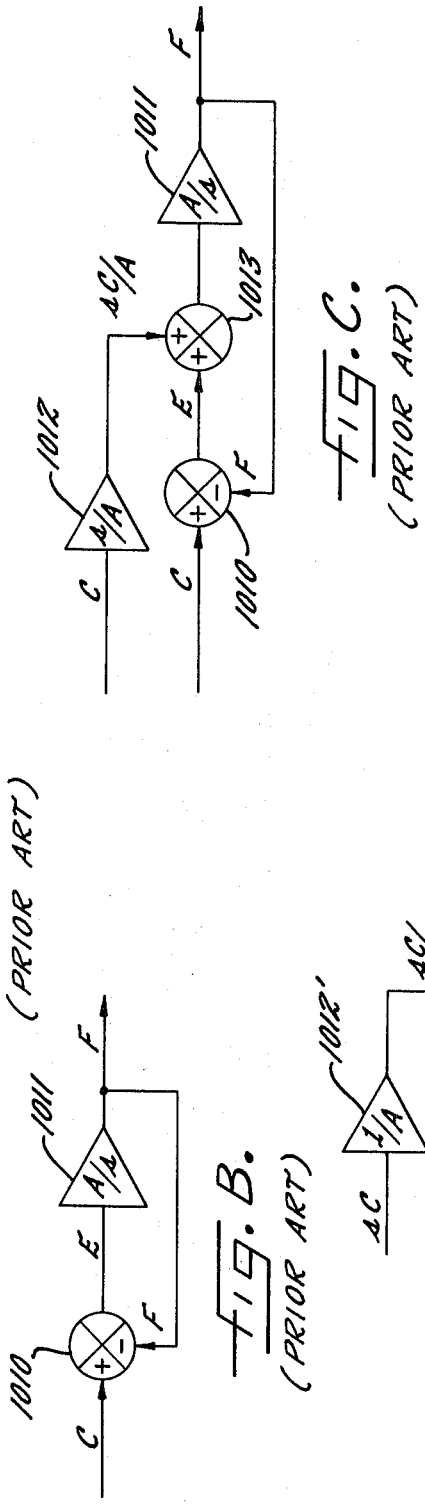

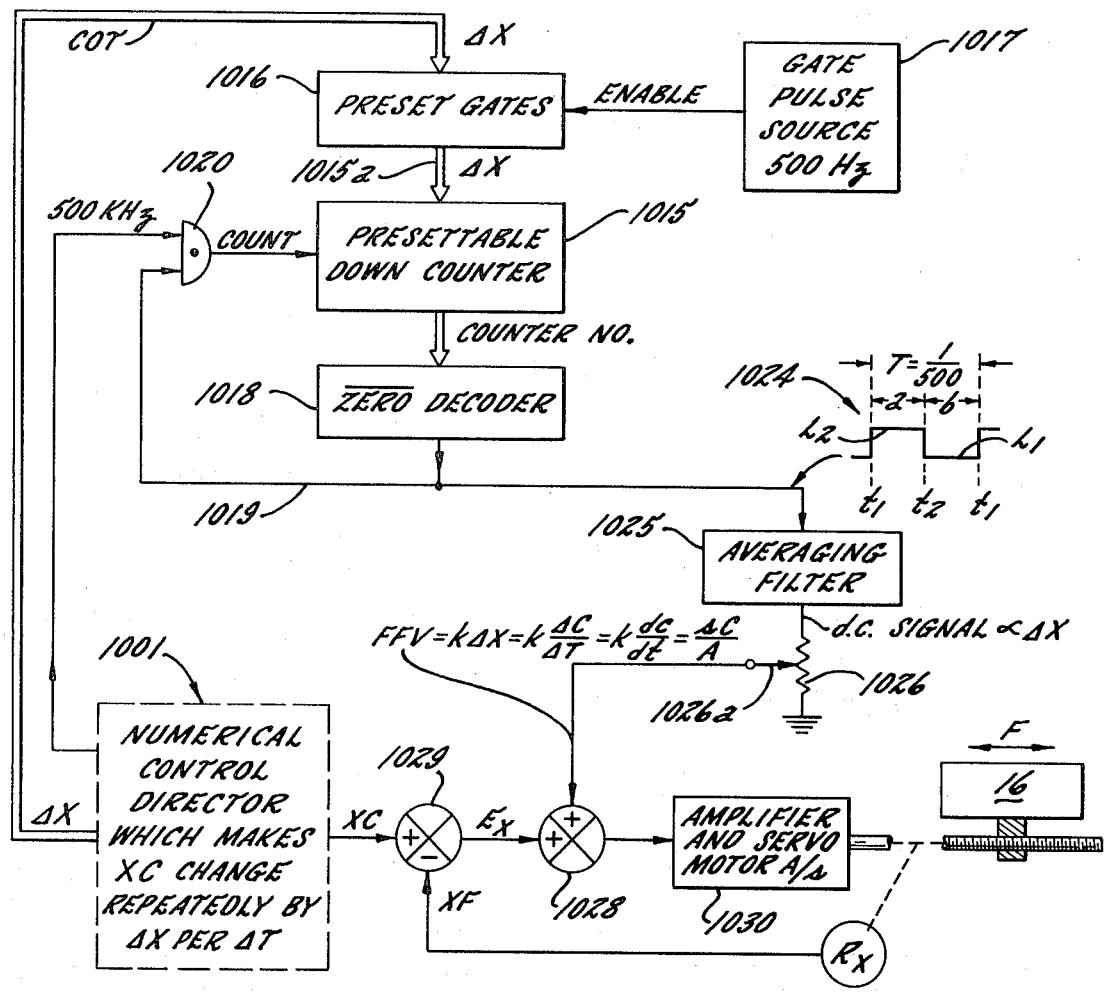
Fig. E.
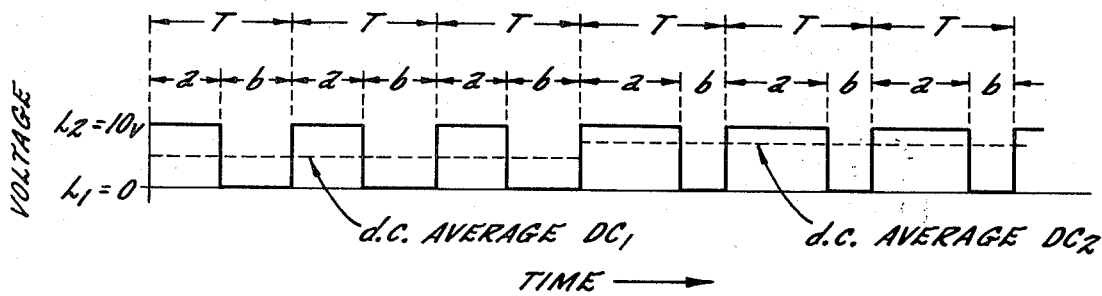
Fig. F.

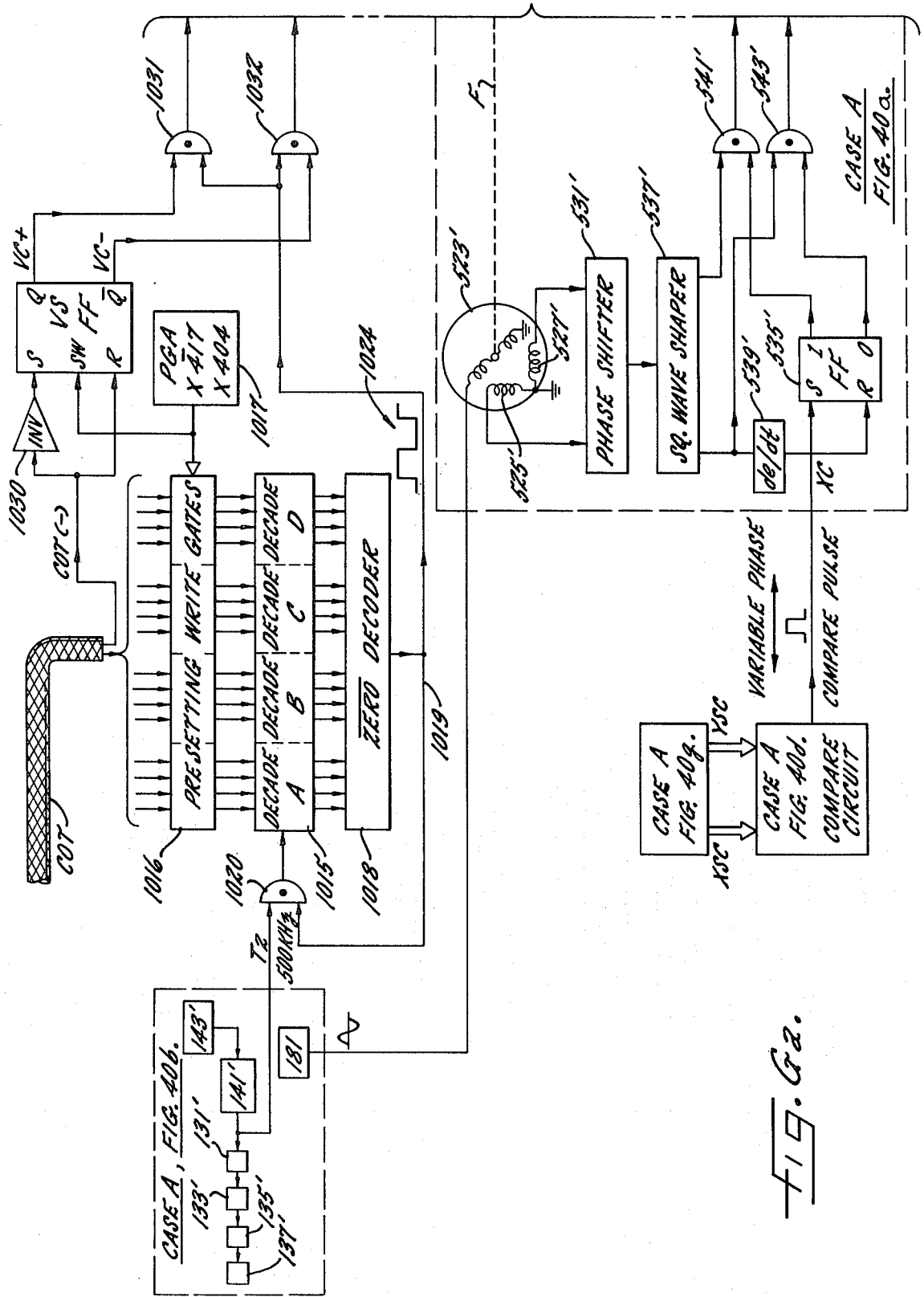
FIG. G2.

[3,798,430]

REDUCTION OF SERVO FOLLOWING ERRORS IN POSITION AND VELOCITY CONTROL SYSTEMS OF THE ITERATIVELY COMPUTING TYPE

BACKGROUND OF THE INVENTION

1. Field of the Invention

The present invention relates in general to closed loop servo systems for driving a movable member along a path (i.e., along an axis) to keep its position dynamically in agreement with a changing position command and to make its velocity substantially equal to the rate of change of the position command. More particularly, the invention relates to such servo systems used with or forming a part of numerical control systems of the type which generate a digitally represented numerical position command changed by iterative computations repeated during each of successive equal time periods $\Delta T$, —and the invention deals with the production and utilization of feed forward signals applied as supplemental inputs to the servos to reduce or eliminate following errors.

2. Description of the Prior Art

The basic concept of "feed forward" to reduce following errors in positioning servo systems is per se well known. Although no attempt has been made to collect and list prior art articles or publications in the technical literature pertaining to "feed forward" in servo controls, the reader may gain a general familiarization with the prior art by referring to Document AD 688 798 distributed by Clearinghouse for Federal and Scientific Information, Springfield, Va. 22151 (such document being Technical Report No. 8 by John A. Miller et al. under Air Force Contract F-44620-68-C-0021) and to the bibliography contained in such document.

Moreover, it has heretofore been proposed to create a supplemental feed forward signal proportional to the desired velocity, and to inject that signal into a servo loop forming a part of a numerical control system, as disclosed in U.S. Pat. No. 3,539,897 issued in the name of M. R. Sommeria. According to the disclosure of the latter patent, however, such a feed forward signal is employed in a numerical control system of the "command pulse" type wherein command pulses of equal weight are generated with varying or changeable frequencies in order to cause a movable element to travel through desired distances and at desired velocities along one or more axes.

SUMMARY OF THE INVENTION

It is the general aim of the invention to reduce the following error in positioning servo systems of the type wherein a changing position command signal is periodically incremented by changeable amounts during each of successive, equal time periods and to do so by creating a feed forward signal injected into the servo loop in a very simple, expeditious and low cost fashion.

A more specific object of the invention is to make advantageous use of changeable, digitally signaled numbers, and timing generator signals, which already exist in a numerical control director of the iteratively computing type disclosed in U.S. Pat. No. 3,656,124, in order to produce feed forward signals which are proportional to the individual axis velocities at which a controlled member is to be moved so as to make its resultant velocity equal to that designated by numerical program information.

Still another object is to reduce servo following errors along any axis X in a numerically controlled positioning system by creating a feed forward signal which is an analog counterpart of a digitally signaled incremental number $\Delta X$, such analog signal accurately tracking changes in that number, —and such number being that which is added or subtracted to a position command number during each of successive, equal time periods $\Delta T$ in order to cause a controlled member to move progressively along the axis at a desired velocity.

These and other objects and advantages will become apparent from the following description, taken with the accompanying drawings.

BRIEF DESCRIPTION OF THE DRAWINGS

The drawing FIGS. 1 through 60 in U.S. Pat. No. 3,656,124 (herein called Case A) are hereby incorporated by reference, and a brief description of such figures at Columns 3–5 of that patent are similarly incorporated. In order that reference may be made herein to both the drawing figures of Case A and those drawing figures which are supplementally included with the present application, those figures which are submitted with the present application will be designated by alphabetical characters, namely:

FIG. A is a generalized block diagram of a numerical control system of the type disclosed in detail by Case A.

Figure 6B:
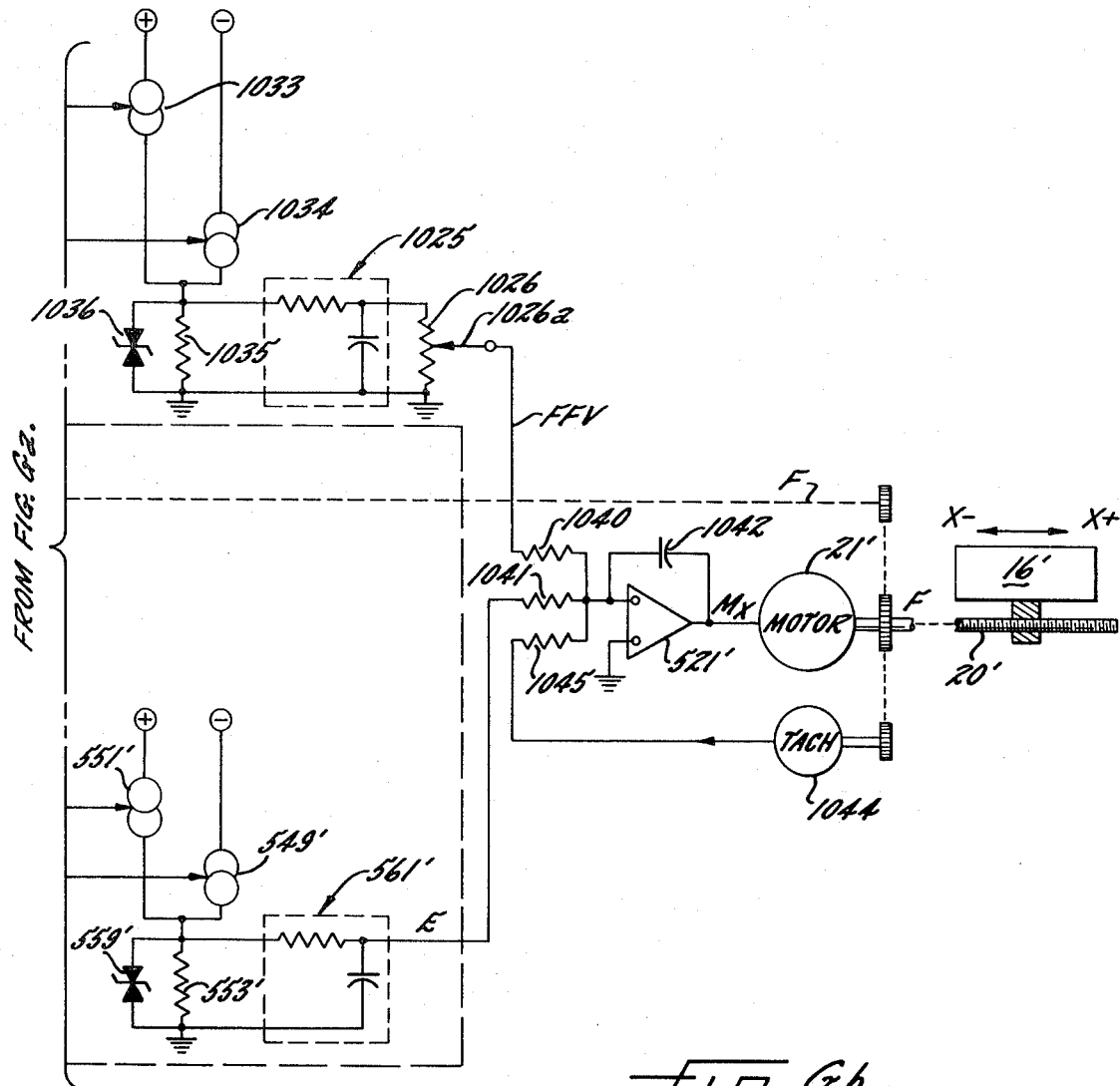

FIG. B is a very diagrammatic but conventional representation of a closed loop positioning system;

FIG. C is similar to FIG. B but shows such a positioning system with two inputs for the purpose of analyzing the effect of a supplemental "feed forward" input signal;

FIG. D corresponds to a portion of FIG. C and indicates the manner in which a supplemental time derivative signal may be applied to a servo loop to create the desired feed forward action;

FIG. E is a block diagram in general form illustrating an embodiment of the present invention;

FIG. F is a graph of voltage versus time showing the manner in which the dc. value of a squarewave voltage, having constant periodicity but a variable duty cycle, changes; and FIGS. Ga and Gb, when joined as indicated, form a composite FIG. G which is a block diagram, partly in schematic circuit form, showing the system of FIG. E in greater detail.

While the invention has been shown and will be described with reference to a specific and preferred embodiment of the apparatus and method steps, there is no intention that the invention thus be limited to such detail. On the contrary, it is intended here to cover all alternatives, modifications and embodiments which fall within the spirit and scope of the appended claims.

DESCRIPTION OF THE PREFERRED EMBODIMENT

CROSS REFERENCE TO U.S. PAT. NO. 3,656,124

In order to make the present specification relatively brief and avoid redescription of both the environment of the present invention and the known elements of an iteratively computing numerical control system which forms a part of the present invention, the specification at Columns 1 through 144 of U.S. Pat. No. 3,656,124

(herein called Case A) is hereby incorporated by reference and made a part hereof. In the description which follows, it will be assumed that the reader is familiar with the drawings, terms and symbols of Case A. Primary reference will be made to the system illustrated in FIGS. 40a through 40m in Case A, but these latter figures are best understood by first becoming familiar with FIGS. 9a through 9l.

BRIEF REVIEW OF THE ITERATIVELY COMPUTING NUMERICAL CONTROL SYSTEM AND ITS SERVOS

FIG. A is a general representation of the iteratively computing numerical control system which is described in more detail by Case A. By way of review, a clocked, iteratively computing director 1001 receives successive sets or blocks of programmed numerical signals from a tape reader 41' (FIG. 40m) which senses a record medium such as a punched tape 37 (FIGS. 3 and 4). Each block of such data defines a linear or circular path segment (see FIG. 2) to be followed by a movable member or cutter 14 in traveling relative to a workpiece 13 (FIG. 1). The composite or path segment motion is the resultant of simultaneous vector component movements along one or more of three axes X, Y and Z. The individual axis components of the cutter's displacement pursuant to any segment are executed by dynamically changing the individual positions of elements such as the saddle 16, the ram 15 and the table 11 of a machine tool (FIG. 1) driven by individual axis servo systems which include motors 21, 25 and 23 coupled by means such as lead screws 20, 24, 22 to those elements. By coordination of the individual axis velocities, the composite or resultant path segment velocity is made to agree with a desired, programmed path feed rate.

It will be recalled that the director 1001 includes a time base generator (FIG. 9b or FIG. 40b) which measures off successive, equal time periods $\Delta T$. In the specific example given, these periods are each 1/50 or 0.020 seconds. Each such period $\Delta T$ spans the interval required for the three decade counters 133, 135, 137 in tandem (FIG. 40b) to count from the decimal state 000 to the state 999. Separate "time steps" of 20 microseconds duration are individually measured off within each period $\Delta T$, and each time step is separately identified by the signaling of a number 000 to 999 on the decoder output terminals marked $\bigotimes$ in FIG. 40b.

During any of the successive periods $\Delta T$, the director may operate in Mode 1, 2, 3 or 4 but for purposes of the present invention, this is of no consequence and only the common or "all modes" sequential operations as set out in Table VII at Column 111 in Case A need be considered. The director may also operate in either a linear or circular interpolation mode, but the operation of the present invention will be equally effective and advantageous in either of such modes.

Without here repeating the details of Case A, it may be noted that the director shown in FIG. A produces sets of digital signals which in BCD notation represent the numerical values of changeable servo command numbers XSC, YSC (and ZSC if a third axis is used). See the registers 121' and 119' in FIG. 40g. These registers have the numbers XSC and YSC incremented (increased or decreased) by amounts $\Delta X$ and $\Delta Y$ (called macromoves) during each period $\Delta T$ by the repeated operation of the time shared digital computer 53' (FIG. 40f). The computer input and output trunks CIT and COT extend to WRITE and READ gates associated with the various storage registers included in the system, and each such gate is controlled by a pulse gate array (PGA) so that it is opened on certain predetermined time steps within successive $\Delta T$'s and according to the mode in which the system is then operating. It will therefore be recalled that in the preferred operation described in Case A, the number held in the XSC register 121' is incrementally changed by an amount $0.1\Delta X$ (called a micromove) at ten equally spaced instants within each period $\Delta T$, as is made clear by Table VII, but the result is to make the number XSC signaled at the output terminals of the register 121' change by an incremental amount $\Delta X$ during each period $\Delta T$, i.e., such that $XSC_{i+1} = XSC_i + \Delta X$. The number YSC is similarly incremented by the amount $\Delta Y$ during each period $\Delta T$.

The macromove numbers $\Delta X$ and $\Delta Y$ (and also $\Delta Z$ if a third axis is employed) are normally computed from time-to-time and indeed as often as once during each $\Delta T$. Thus they are changeable numbers. Their values depend upon both (a) the path velocity at which the main controlled member or cutter 14 is to move relative to the workpiece 13, and (b) the angle $\theta$ which the path segment makes with the X axis. These numbers $\Delta X$ and $\Delta Y$ are numerically represented in BCD notation by respective sets of digital output signals from storage registers 109' and 107' in FIG. 40h. The computer 53 coupled via PGA's and READ and WRITE gates to these $\Delta X$ and $\Delta Y$ registers causes the macromove numbers $\Delta X$ and $\Delta Y$ to be changed periodically under certain conditions as shown for example in Table VIII.

As represented in FIG. A, the changeable position commands digitally signaled as numbers XSC, YSC, ZSC are supplied as inputs to digital-to-analog converters 1002, 1003, 1004. The outputs of the latter are analog signals XC, YC, ZC which vary according to changes in the digital position command numbers XSC, YSC and ZSC. In the preferred embodiment of Case A, each of these digital-to-analog converters is constituted by a compare circuit (see 533 in FIG. 40d) which receives the signaled position command number and also receives digital sweep numbers from FIG. 40b, so as to act as a digital-to-phase converter. In other words, each of the compare circuits produces a pulse during each cycle of a digital sweep which has a frequency of 500 Hz., with the time location or phase of that pulse within each cycle spaced from the cycle mid-point according to the then-existing value of the digital input number XSC or YSC. The phase of the compare output pulses thus represents in analog form the desired position of the controlled member along the corresponding axis. But further, the timing signal generator of FIG. 40b also produces from a wave shaper 181' a sinusoidal reference voltage having a frequency of 500 Hz., and in phase with the digital sweep, as shown in FIG. 10b. This reference voltage is applied as an excitation signal to feedback transducers associated with the element movable along each axis, such transducers being here shown in FIG. A as resolvers $R_x$, $R_y$, $R_z$. The rotors of these resolvers are directly or indirectly coupled to the output shafts of the corresponding axis servo motors 21, 25, 23 and their output windings thus produce sinusoidal feedback signals XF, YF, ZF which, in effect, represent the actual axis positions by their phase relative to the reference wave. The analog position command signal XC and the feedback signal XF are supplied as inputs to a servo system generally represented at 1005 in FIG. A. The position command signals and feedback signals are similarly applied to servo amplifiers 1006 and 1007 for the Y and Z axes. In each case, the servo amplifier acts to subtract the actual position signal XF from the position command signal XC and to amplify the difference or error. The amplifier output $M_x$ is applied to the motor; it is a voltage which is proportional to the difference or error $E = XC - XF$. Thus, the motor-energizing voltages labeled $M_x$, $M_y$ and $M_c$ in FIG. A are instantaneously proportional to the position errors, and they thus cause the driven elements 16, 15 and 11 to move at velocities which are proportional to the respective axis position errors.

As will be apparent, in order to make the controlled elements move at relatively high velocities, the position errors must be relatively large. This position error is called the "following error" and it may be different for different axes because the individual axis velocities may be widely different at any one time, depending upon the angle of the composite path segment. In consequence, the accuracy with which the final controlled member (the cutter 14) tracks the desired path segment may be adversely degraded to a significant degree.

ELEMENTARY REVIEW OF FEED FORWARD ACTION

Referring to the very simple representation of a closed loop, negative feedback positioning servo system in FIG. B, it may be assumed that an input command signal C is applied through an algebraic summing device 1010 to a combined amplifier and actuator 1011 which may include a motor and suitable elements such as gears coupling it to the driven element. The output of the amplifier-actuator is here labeled F and represents the actual position of the controlled element. By appropriate feedback means, the output F is applied subtractively to the summing device 1010 so that the input to the amplifier-actuator may be deemed as equaling the difference error E between the input command C and the output F. In a very simplified sense, the transfer function of the amplifier-actuator 1011 may be considered as equal to A/s where A represents the gain and s is the differential operator (representing d/dt) employed in LaPlace transforms.

The applicable equations for FIG. B may be written to illustrate the existence of a following error in a conventional positioning servo system. To begin, it is apparent that the output F of the amplifier-actuator 1011 is equal to its input multiplied by its transfer function:

$$F = EA/s \tag{1}$$

But the error is simply equal to the difference between the input C and the feedback signal F, i.e.:

$$E = C - F; \; C = E + F \tag{2}$$

By substituting Equation (1) into Equation (2), one obtains:

$$F = A/s \; (C-F) \tag{3}$$

And by re-arrangement, Equation (3) becomes:

$$F = AC/s - FA/s \tag{3a}$$

$$F(1 + A/s) = AC/s \tag{3b}$$

$$Fs + FA = AC \tag{3c}$$

If the value of C from Equation (2) is substituted into Equation (3c), the result becomes:

$$Fs + FA = A(E + F) \tag{4}$$

And by re-arrangement and solution for E, this reduces to:

$$F(S + A - A) = AE \tag{4a}$$

$$E = sF/A \tag{4b}$$

It is apparent, therefore, that in a conventional positioning servo system the error E is finite and proportional to the rate of change of the output F. Even though the error E can be held relatively low by making the gain A large, there are limits imposed upon the magnitude of gain which can be used because of stability considerations.

If, however, a supplemental input signal is injected into the servo system of FIG. B—as here represented in FIG. C—then the following error can be reduced and made to approach practically zero. Assume for the moment that the same command signal C is passed through an amplifier or signal transforming circuit 1012 having a transfer function which is the inverse of that for the amplifier-actuator 1011, namely, s/A. Assume further that the output from the unit 1012, which is sC/A, is applied to a second summing device 1013 so that it is combined additively with the error signal E discussed above with reference to FIG. B. In this arrangement, the applicable equations may be written by recognizing that the output F is equal to the input applied to the amplifier-actuator 1011 multiplied by the latter's transfer function, and that input is the sum of the two signals applied to the summing device 1013. Thus, one may write:

$$F = EA/s + sC/A \cdot A/s = EA/s + C \tag{1'}$$

The error signal E is related to the input signal C and the feedback signal F as above stated, namely:

$$E = C - F; \; F = C - E \tag{2'}$$

By substituting F from Equation (1') into Equation (2'), one obtains:

$$C - E = EA/s + C \quad (5)$$

which simplifies to:

$$EA/s + E = 0 \quad (5a)$$

$$E(A/s + 1) = 0 \quad (5b)$$

$$E = 0 \quad (5c)$$

Equation (5b) on its face seems to indicate a second solution by which the quantity A/s is equal to $a - 1$ but that solution is obviously invalid because the gain A is always a constant having a positive finite value. Thus, from Equation (5c) it is clear that the injection of a signal sC/A additively combined with the error E of the positioning servo can result in the following error being held substantially at zero as the input and output signals have different rates of change representing different commanded and actual velocities.

FIG. C makes it plain that the auxiliary signal to be injected into the servo can take the form sC applied to an amplifier or attentating element 1012' having a gain of 1/A, and this will result in the creation of a signal sC/A for injection into the summing device 1013. Recalling that s represents a differential operator, the signal sC as shown in FIG. D thus may be one which varies as the rate of change of the main position command signal C, i.e., the signal sC may be one which represents a desired velocity corresponding to the rate of change of the desired position command signal C.

A PREFERRED EMBODIMENT OF THE PRESENT INVENTION

In accordance with the present invention, it has been discovered that in an iteratively computing numerical control system of the type here described, the digitally signaled increment number for any axis (that is, $\Delta X$, $\Delta Y$ or $\Delta Z$), continuously available but changeable in value, is always directly proportional to the velocity at which the element is to be driven along that axis; and provision is made to derive from that signaled increment number a proportional signal which is injected into the axis servo loop to create feed forward action and reduction or elimination of the following error.

More particularly, and in the preferred embodiment shown in FIG. E for the X axis (substantial duplicates, not shown, being employed for any other axes such as Y and Z), the number $\Delta X$ signaled by the numerical control director 1001 is converted into a correspondingly varying analog dc. voltage. This voltage is added to the error signal E in the X axis servo loop. Thus, by the addition of only a few relatively simple apparatus components to the existing structure of the iteratively computing director and the servo system, the advantages of feed forward compensation are achieved.

Specifically in carry out the invention, a presettable digital counter 1015 is provided together with means responsive to the digital signals representing $\Delta X$ to preset that counter to a count state or number N which differs from a predetermined count state or number P by the magnitude of the number $\Delta X$. This presetting is performed once during each of successive equal time periods $\Delta T'$ of predetermined duration but which in any event are shorter than the iteration periods $\Delta T$. In the preferred arrangement shown, the count state N is equal to $\Delta X$ and the predetermined count state P is zero, so by directly presetting the number $\Delta X$ into the counter, the difference is $N - P = \Delta X - 0 = \Delta X$. As illustrated in FIG. E, the presettable counter 1015 has presetting input terminals connected to a multi-conductor input trunk 1015a forming the output of presetting gates 1016 which receive as their inputs the conductors of the computer output trunk COT existing in the director 1001. The presetting gates are normally closed, but they are enabled or opened once during each 1/500 second by a gate pulse source 1017, thus, making the shorter period $\Delta T'$ in this example equal to 1/500 second. As will be explained hereinafter, the gate pulse source shown in FIG. E may be easily constructed as a pulse gate array of the type employed in the director 1001, and it can readily be controlled to open the gates 1016 five hundred times during each second.

Further in keeping with the invention, the counter 1015 is associated with means to make it always receive and count recurring pulses of a predetermined frequency whenever it is not in the predetermined count state P, so that it counts from the state N to which it is preset toward the count state P. Thereafter the counting operation ceases until the next presetting operation occurs. As shown in FIG. E, the counter 1015 is a downwardly counting counter having output terminals connected through a multi-conductor cable to an associated $\overline{zero}$ decoder 1018. The organization of the decoder will be readily known to and understood by those skilled in the art; it functions simply to produce a binary "1" level voltage on its output conductor 1019 whenever the counter is in any count state other than P (e.g., other than zero), This decoder output is connected as one input to an AND gate 1020 which receives as its other input a 500 KHz. train of regularly recurring pulses. In the preferred arrangement, this train of pulses appears in the timing signal generator of the director 1001, and thus need only be supplied by a connecting conductor to the gate 1020. The output of that gate leads to the pulse input of the counter 1015. It will be apparent that immediately after the number $\Delta X$ has been preset into the down counter 1015, the latter counts downwardly from count state N (in this example, $\Delta X$) toward count state P (in this example, zero). When it reaches the latter count state, the input of counting pulses is terminated by closure of the N gate 1020. Thereafter, when the gate pulse source 1017 again opens the presetting gates 1016 and the number $\Delta X$ is transferred from the output trunk COT to again preset the counter to the number $\Delta X$, the down counting operation is started again. Because the periodicity of the recurring pulses is less than the periodicity with which the counter 1015 is preset (that is, the pulse frequency is 500 KHz while the presetting frequency is 500Hz), the time interval occupied by each down counting to zero is accurately proportional to the number $\Delta X$ to which the counter is preset before down counting begins.

Further in the practice of the invention, means are provided for producing a squarewave voltage which has one level when the presettable counter is in a first predetermined count state (here the count state P which is assumed to be zero) and which has a second level when the counter is not in that particular count state.

As a surprising and unique advantage of the present invention in the embodiment of FIG. E, this latter means is constituted directly by the zero decoder 1018, and the bi-level squarewave voltage appears directly on the output conductor 1019 of that decoder. As illustrated in FIG. E, the conductor 1019 carries a squarewave voltage 1024 having a first or zero volt level $L_1$ whenever the counter 1015 contains the predetermined number P (in this example, zero); and having a second level $L_2$ whenever the counter holds any other number. Merely as an example, the squarewave voltage level $L_1$ may be zero volts, and the squarewave voltage level $L_2$ may be +10 volts. Since the beginning instant $t_1$ in each cycle of this squarewave coincides with the presetting of the counter 1015 to a count state equaling the number $\Delta X$, and since the squarewave switches from the level $L_2$ to the level $L_1$ at an instant $t_2$ spaced by a time interval $a$ which must be proportional to the number $\Delta X$, the squarewave 1024 has a constant frequency (i.e., a period of 1/500 second), but the duty cycle—that is, the ratio of its high to low level intervals here labeled $a$ and $b$—varies directly according to changes in the value of the number $\Delta X$.

The variable duty cycle squarewave voltage 1024 is passed through an averaging filter 1025 to produce a dc. signal which varies in magnitude smoothly as the duty cycle changes. As illustrated in FIG. F, a squarewave voltage which resides alternately at two levels $L_2$ and $L_1$, always with a constant period T, but with changes in the duration $a$ of the level $L_2$ intervals, has a dc. or average value representable as dotted lines $DC_1$ and $DC_2$. When the duty cycle or ratio $a/b$ results in a dc. voltage $DC_1$, and if the ratio $a/b$ increases, then the dc. voltage correspondingly receives to a higher value $DC_2$.

The dc. output of the filter 1025 is applied across a potentiometer 1026 having an adjustable wiper 1026a which is connected to one of the inputs of an algebraic summing device 1028. The second input to this latter device is the error signal $E_x$ which is created by another algebraic summing device 1029 having as its two inputs (a) the analog X axis position command signal XC and (b) the analog actual position feedback signal XF, the latter being created by an appropriate feedback transducer here shown as a resolver $R_x$ mechanically coupled to the output shaft of an amplifier-actuator 1030. This amplifier-actuator as shown in FIG. E includes a separate amplifier and the X axis servo motor, and may be characterized as having a transfer function A/s. It receives as its input signal the output of the summing device 1028, and its output F may be designated as the X axis position in which a controlled element, such as the saddle 16, resides.

By way of a summary description of operation, it may be noted that the number $\Delta X$ is continuously signaled in the numerical control director 1001, and in particular it is signaled by the output terminals of the register 109 in FIG. 9h. As indicated by the programming sequences shown in Table VII, the number $\Delta X$ is read from the $\Delta X$ register 109 into the cleared computer 53' 10 times during each period $\Delta T$, i.e., at time step 016 in each of Time Columns X00 through X300 and X500 through X900. During Time Column X400 the number $\Delta X$ is also read into the cleared computer, but on time step X403. Thus, it is a simple matter to utilize the next-succeeding time step in each of the Table VII time columns to "write" the number $\Delta X$ from the computer output trunk COT into the counter 1015 before continuing the subsequent operations which are set out in Table VII. The gate pulse source 1017 supplies an enabling pulse to the presetting gates 1016 on time step X404 and all of the time steps XX17 (except X417) during each $\Delta T$ iteration period represented by Table VII. In this fashion, the gates 1016 preset into the counter 1015 from the output trunk COT the number $\Delta X$ 500 times each second.

Immediately after such presetting of the down counter 1015, the squarewave voltage on line 1019 rises to a high level $L_2$ and enables the gate 1020 so that pulses at a frequency of 500 KHz. are transmitted to the counting input of the counter. The counter than proceeds to count down and the signal on line 1019 remains at the high level $L_2$ until a zero count is reached, with the result that the time interval $a$ during which down counting takes place, and during which the squarewave voltages remain at the level $L_2$, is proportional to the last-signaled value of the number $\Delta X$. When the squarewave voltage 1024 falls to its lower level $L_1$ (because the counter 1015 has reached zero count), the gate 1020 closes and counting ceases until the gate pulse source 1017 again opens the presetting gates 1016.

The squarewave voltage 1024 is one which varies in its duty cycle according to changes in the number $\Delta X$. The dc. voltage produced by the averaging filter 1025, therefore, varies in magnitude with changes in the number $\Delta X$, and a predetermined fraction of that voltage is tapped from the potentiometer 1026 and fed via the wiper 1026A to one input of the summing device 1028.

This input signal to the summing device may be designated as a feed forward voltage FFV. It is, as noted, proportional to the signaled number $\Delta X$, i.e., $FFV=k_1\Delta X$. It will be recalled, however, that the number XSC signaled in the director 101 is dynamically changed to represent a changing commanded position for the element 16. Indeed, it is dynamically changed by algebraically adding the number $\Delta X$ thereto once during each iteration period $\Delta T$. Thus, the changes in the command signal XSC and its analog counterpart XC may be represented as $\Delta C/\Delta T$ where $\Delta C$ is equal in value to the number $\Delta X$. It becomes apparent, therefore, that $\Delta X$ is directly proportional to the desired velocity at which the element 16 is to move along the X axis, but this number is proportional to the first time derivative $dC/dT$. If one uses the derivative operator $s$, it may be said that the feed forward voltage FFV is equal to $sC/A$, where A is a factor of proportionality representing gain or attenuation, and which may be adjusted in its value by changing the setting of the wiper 1026a. Given an existing servo system having an amplifier-motor actuator with a transfer function of A/s, it is thus a simple matter to adjust wiper 1026a so that the feed forward voltage FFV is equal to $sC/A$ or, in other words, proportional to the desired velocity which is represented by the then-existing rate of change of the input position command signal XSC.

FIG. G shows in greater detail the apparatus generally depicted in FIG. E, and illustrates how the feed forward voltage FFV may be created with a plus or minus polarity whenever the $\Delta X$ number is positive or negative (and the XSC number is being increased or decreased during each period $\Delta T$). As will be apparent, the down counter 1015 is organized specifically to include four tandem counter decades A, B, C, D each having four presetting input lines and four output lines, each signaling in BCD notation any decimal digit value between 0 and 9. The decimal point is implicitly located one place to the left of decade A, so that the counter can be preset to hold any ΔX number from 0 to 0.09999. The presetting WRITE gates 1016 are arranged in four four-part sets each corresponding to one decade or one decimal digit place, each individual input terminal of these presetting gates being connected to one of the COT conductors and the individual output terminals of these gates being connected to the corresponding pre-setting inputs of the counter. The gates are all enabled or opened by an enabling signal from a PGA 1017 which has its inputs connected to the $\bigotimes$ terminals of FIG. 40b such that it produces an enabling signal on time steps $X\overline{4}17$ and X404 of every period ΔT. The organization of the diodes in the PGA 1017 will be readily apparent to those skilled in the art from what has been said above. For the sake of completeness it may be considered that the legend "SAR" presently appearing in Table VII for time steps X017, X117, X217, X317, X517, X617, X717, X817 and X917— is modified to read "W/PSC,SAR," where PSC stands for "presettable counter." Thus, on the seventeenth step within every time column of a ΔT period (excepting Column X400) the number ΔX which has previously been read into the cleared computer is "written" into the counter 1015. Similarly, the legend which appears at time step X404 in Table VII is modified from its previous form "R/XCP" to read "W/PSC, R/XCP." This assures that the counter 1015 is preset to the number ΔX during every time column X400 of each measured period ΔT, and it is thus so preset 10 times per period ΔT or at a rate of once each 1/500 seconds.

The AND gate 1020 shown in FIG. G receives one input from the output of the zero decoder 1018 via line 1019 as previously described. However, in FIG. G it is indicated that the source of recurring pulses at a 500 KHz. frequency supplied to the AND gate 1020 may be readily taken from the timing signal generator which is illustrated in FIG. 40b. Specifically, the output of the divide-by-four circuit 141' in FIG. 40b is a train of pulses having a frequency of 500 KHz. Thus, in addition to being passed into the A decade counter 131' in FIG. 40b, this train of pulses is also coupled by a single conductor to the second input of the AND gate 1020. Thus, whenever the gate is enabled, it passes relatively high frequency (500 KHz) pulses to the counting input of the down counter 1015.

That portion of FIG. G which is enclosed within dashed lines corresponds essentially to the apparatus shown in FIG. 40a, and it has been so labeled in FIG. G. The same reference characters which appear in FIG. 40a are here employed, so that the operation of this portion of the apparatus will already be understood. Briefly stated, however, the compare circuit which is shown in FIG. 40d produces a variable phase compare pulse (as noted above) in response to input signals XSC which are supplied from the register 121' which is shown in FIG. 40g. This variable phase compare pulse is labeled XC in FIG. G and is an analog phase variation which from instant to instant designates the commanded position to which the controlled element 16' is to be moved. These compare pulses are passed to the "set" input of a flip-flop 535' which, as described above, functions as a phase discriminator, comparing phase of the pulses XC with the feedback signals produced by the resolver 523' as processed through a phase shifter 531' and a square wave shaper 537'. That is, the flip-flop 535' produces at its "1" and "0" output terminals complemental squarewaves having duty cycles and average dc. values which vary according to the position error, i.e., the difference between the phase of the pulses XC and the phase of the feedback wave produced by the resolver 523' and phase shifter 531'. As confirmed by FIG. G, the resolver 523' has its rotor coupled to the output shaft of the servo motor 21', so that a phase variable analog signal representing the actual position of the movable element 16' is fed back to the phase discriminator. It will be recognized that the phase discriminator, which is formed by the phase shifter 531', shaper 537' and flip-flop 535', functions as an algebraic summing device, that is, the output signal produced by the selectively enabled current generators 551' and 549' across the resistor 553' is a squarewave having a variable duty cycle which changes according to the difference between the input signal XC and the feedback signal F. The filter 561' converts this variable duty cycle squarewave, which can have either positive or negative pulse portions, into a relatively smooth dc. voltage proportional to the error E, i.e., proportional to the difference between the command signal XC and the feedback signal F.

To complete the feed forward portion of the apparatus shown in FIG. G, and to permit the feed forward voltage FFV to be positive or negative when the number ΔX is positive or negative, a switched flip-flop VS is controlled by signals representing the sign of the number ΔX and set to the proper one of its two possible states by the output pulse from the PGA 1017 every 1/500 second. It will be recalled that the COT(−) conductor which is included within the computer output trunk COT resides at a binary "1" level when the number contained in the computer accumulator has a negative sign, and it resides at a binary "0" level when that number has a positive sign. Thus, at those instants (described above) when the number ΔX is in the accumulator, the conductor COT(−) will reside at a binary "0" or "1" level if the sign of the ΔX number is positive or negative. This conductor COT(−) is coupled directly through the reset control terminal R of the switched flip-flop VS, and it is coupled to an inverter 1030 to the set control terminal S. In addition, the output of the PGA 1017 is connected to the switch input terminal SW of the flip-flop so that at those instants when the PGA produces an enabling pulse, the flip-flop VS is switched to its binary "1" or its binary "0" state if the number ΔX is positive or negative in sign. The signals VC+ and VC− appearing on conductors connected to the Q and Q outputs of the flip-flop VS thus respectively reside at binary "1" levels if the sign of the ΔX number last preset into the counter 1015 is positive or negative. These outputs are connected respectively as countrolling inputs to two AND gates 1031 and 1032 which both receive as their second inputs the squarewave 1024 produced by the decoder 1018. Therefore, during those intervals when the squarewave 1024 is at its high or binary "1" level $L_2$, the gate 1031 will produce an output response if the ΔX number has a positive sign; but conversely during those time intervals when the squarewave 1024 is at its high level $L_2$, the gate 1032 will produce an output signal if the ΔX number has a negative sign.

The outputs of the gates 1031 and 1032 are respectively supplied as controlling signals to switchable, constant current generators 1033 and 1034, respectively, to turn the latter on or off. These two constant current generators are supplied respectively from positive and negative voltage sources, so that when the generator 1033 is turned on a positive voltage drop will appear across a common series resistor 1035, and when the generator 1034 is turned on a negative voltage drop will appear across that resistor. In either case, the amplitude of the voltage appearing across the resistor 1035 is limited and held constant at a predetermined value established by a bi-directional Zener diode 1036. Thus, the output across the resistor 1035 is a squarewave having a variable duty cycle identical to that of the squarewave having a variable duty cycle identical to that of the square wave 1024, but the "on" pulses within that squarewave will be of positive polarity if the sign of the ΔX number is positive and will be of negative polarity if the sign of the ΔX number is negative. In effect, therefore, a bi-polar variable duty cycle squarewave is created with the "on" periods determined by and made proportional to the magnitude of the ΔX number, and with the polarity of the squarewave being determined by the sign of the ΔX number. This bi-polar squarewave is passed through the smoothing or averaging filter 1025 and thence supplied across the potentiometer 1026, so that the final feed forward voltage FFV appearing on the potentiometer wiper 1026a is proportional to the number ΔX and agreeable in polarity with the sign of that number. The factor of proportionality may, of course, be adjusted by setting the position of the wiper 1026a.

For the purpose of adding the feed forward voltage FFV to the error signal or voltage E, these two voltages are applied through input resistors 1040 and 1041 to the input terminal of a combined algebraic summing and amplifying device, here shown as a summing operational amplifier 521' having a negative feedback path formed by a capacitor 1042. As is well known, such an operational amplifier 521' functions to produce an output signal here labeled $M_x$ which is eqaul to the weighted sum of the input signals, the weighting being determined by the relative magnitudes of the resistors 1040 and 1041. To impart stiffness to the servo response characteristics, a tachometer 1044 is coupled to be driven by the motor 21', and its dc. voltage (proportional to motor speed) is also applied in an additive sense through a resistor 1045 to the input terminal of the amplifier 521'.

In summary, the apparatus illustrated by FIG. G employs a successively preset down counter 1015 to produce a variable duty cycle squarewave 1024 which has a dc. or average value proportional to the number ΔX. This dc. average value, as noted above, is therefore proportional to the desired velocity at which the controlled element 16' is to be moved, and it is proportional to the rate of change of the position command signals XSC (in digital form) and XC (in analog form). The squarewave 1024 is, however, converted into a bipolar squarewave by the controlled flip-flop VS, gates 1031 and 1032, and the constant current generators 1033, 1034. The bi-polar variable squarewave signal appearing across the resistor 1035 is converted into a corresponding dc. variation, and thus the feed forward voltage FFV may be of either positive or negative polarity depending upon whether the position command signal XC is increasing or decreasing. By proper sizing of the individual circuit components and adjustment of the potentiometer 1026, the feed forward voltage can be made to represent the quantity sc/A in a system having an amplifier 521', motor 21' and drive connections which collectively exhibit a transfer function of A/s. With such adjustments, the system will operate with substantially zero following error. This improvement is brought about by the relatively simple addition of only a few components to an iteratively computing numerical control director.

Those skilled in the art will recognize that an equivalent operation and result can be obtained by making the counter 1015 an upwardly counting counter instead of a down counter. If this choice is made, it is only necessary that appropriate inverters be interposed just ahead of or just following the gates 1016 so as to preset the counter to the complement of the ΔX number, and therefore, in effect, to the negative of the ΔX number. In this way, the counter would always be preset to an effectively negative value and would count up to its zero count state for an interval of time proportional to the value of the ΔX number.

We claim:

1. In a positioning system for moving an element to successive positions along an axis in accordance with numerical commands, the combination comprising
  a. means for measuring off successive equal time periods ΔT,
  b. means for producing first signals digitally representing a changeable number ΔX, where ΔX is proportional to the velocity $V_r$ at which said element is to be moved,
  c. means for producing second signals digitally representing a changeable command number XSC and for changing it by the amount ΔX during each period ΔT,
  d. means for converting said second signals into a correspondingly changing analog command signal,
  e. means for producing an analog feedback signal representing the actual position of the element along the axis,
  f. means responsive to said first signals for producing an analog feed forward signal proportional to the changeable number ΔX,
  g. means for combining said feedback signal subtractively and said feed forward signal additively with said command signal to produce a modified error signal, and
  h. amplifier and motor means responsive to said error signal for driving said element along the axis.

2. The combination set forth in claim 1 further including means for adjusting the constant of proportionality relating said feed forward signal to the number ΔX represented by said first signals.

3. The combination set forth in claim 1 further characterized in that said adjusting means is adjusted to make said constant of proportionality substantially equal to 1/A, where A is the gain in the generalized transfer function A/s of said amplifier and motor means.

4. The combination set forth in claim 1 further characterized in that said means (f) comprises a digital counter; means responsive to said first signals for presetting said counter, once during each of successive equal time periods ΔT', to hold a count state or number N, where N differs from a predetermined count state or number P by the magnitude of the number ΔX; means for supplying recurring pulses to said counter to cause it to count toward said predetermined count state P at all times that it does not hold the number P; means for producing a squarewave voltage which has one level when said counter is in its P state and a second level when said counter is not in its P state, whereby the duty cycle and the average value of said squarewave voltage varies in proportion to changes in the number ΔX; and means for converting said squarewave voltage into a dc. voltage which varies according to changes in said average value; the periods ΔT' being shorter than said periods ΔT and the period of said recurring pulses being shorter than said periods Δ T'.

5. In combination with means for producing a first set of signals XSC digitally representing the commanded position of a member movable along an axis, means for producing a second set of signals digitally representing a changeable number ΔX, means responsive to said second set of signals for changing said first signals to increment the number XSC by the amount ΔX during each of successive equal time periods ΔT, a D-to-A converter for converting said first signals into a correspondingly changing analog command signal, and servo drive means responsive to said command signal and including position feedback means for driving said member along the axis to keep its actual position substantially in agreement with that represented by the XSC number, the improvement which comprises:
 a. means responsive to said second set of signals for producing a feed forward analog signal which dynamically varies to be proportional to said number ΔX as the latter changes, and
 b. means for additively combining said feed forward signal with said command signal and making said servo drive means responsive to the effective sum thereof.

6. The combination set forth in claim 5 further characterized in that said servo drive means has a transfer function generally representable by A/s where A represents gain and $s$ is a derivative operator, and said means (a) includes means for making the factor of proportionality relating said feed forward signal to the number ΔX substantially equal to 1/A, such that the feed forward signal in magnitude and polarity is approximately equal to $\Delta X/A$.

7. In a system having a servo drive with feedback to move a member along an axis, and means for supplying a primary input signal to said servo drive which changes during each of successive equal periods ΔT an amount corresponding to a changeable number ΔX represented by a set of digital signals, the combination comprising a. means responsive to said digital signals for producing an analog signal substantially instantaneously proportional to the number ΔX, and
 b. means for supplying said analog signal as a secondary input to said servo drive and in a sense to additively supplement said primary input signal.

8. In a positioning system having a servo drive with feedback to move a member along an axis, in response to a primary input signal; together with means for changing said primary input signal, during each of successive equal time periods ΔT, an amount corresponding to a changeable number ΔX represented by a set of digital signals; the combination comprising
 a. a digital counter,
 b. means responsive to said digital signals to preset said counter to a count state N which differs from a predetermined count state P by the amount ΔX,
 c. a source of regularly recurring pulses,
 d. means responsive to output signals from said counter and representing its count state for supplying said pulses to said counter to make the latter count toward said count state P at all times when it is not in state P,
 e. means for producing a squarewave signal having first and second levels when said counter respectively is and is not in said count state P,
 f. means for converting said squarewave signal into an analog signal which varies according to the duty cycle of said squarewave, and
 g. means for supplying said analog signal as a supplementary input signal to said servo drive and causing the latter to respond to the additive combination of the primary and supplementary input signals.

9. The combination set forth in claim 8 further characterized in that said means (d) and (e) are constituted by a decoder connected to receive output signals from the counter which represent its count state and including means for producing a response signal having first or second levels when the counter respectively is or is not in said count state P, said response signal being said squarewave, and a gate having its output connected to the counting input of said counter and having two inputs respectively connected to receive (i) said recurring pulses and (ii) said response signal.

10. The combination set forth in claim 8 further characterized in that said number ΔX may be positive or negative and its sign represented by 0 or 1 level of one bit signal in said set of digital signals, and said means (e) includes
 e1. means for making said squarewave signal have a first positive level when said one bit signal is a 1 and said counter is not in its count state P,
 e2. means for making said squarewave signal have a second negative level, equal in magnitude to the first, when said one bit signal is a 0 and said counter is not in its count state P, and
 e3. means for making said squarewave signal have a third, zero level when said counter is in its count state P.

11. The combination set forth in claim 8 further characterized in that said predetermined count state P is zero.

12. The combination set forth in claim 11 further characterized in that said presetting means sets said counter to a count state N which is equal to the number ΔX, and said counter is a down counter which counts downwardly in response to said recurring pulses.

13. The combination set forth in claim 11 further characterized in that said presetting means sets said counter to a count state N which is the complement of the number ΔX, and said counter is an upward counter which counts upwardly in response to said recurring pulses.

14. The method of moving a member along an axis to keep its position dynamically in agreement with a changing position command, said method comprising the steps of a. measuring off successive equal time periods $\Delta T$,
b. producing a first set of digital signals representing a commanded position number XSC,
c. producing a second set of digital signals representing a changeable increment number $\Delta X$, where $\Delta X = V_x/\Delta T$ and $V_x$ is the desired velocity of said member,
d. utilizing said second set of signals to change the first set of signals during each period $\Delta T$ so as to change the number $XSC_i + \Delta X = XSC_{i+1}$,
e. converting said first set of signals into an analog command signal which varies according to the changes in the number XSC,
f. converting said second set of signals into an analog feed forward signal which varies according to the changes in the number $\Delta X$, and
g. utilizing said command and feed forward signals as additive inputs to a servo positioning drive means coupled to move the member along the axis, said drive means having a position feedback loop, whereby the following error between the actual position and the commanded position represented by said first set of signals is reduced.

* * * * *